US00RE38192E

(19) United States
(12) Reissued Patent
Krüger et al.

(10) Patent Number: US RE38,192 E
(45) Date of Reissued Patent: Jul. 22, 2003

(54) APPARATUS FOR PRODUCING A VARIABLE VOLUMETRIC FLOW IN A FUEL FEED SYSTEM

(75) Inventors: Hinrich Krüger, Regensburg (DE); Martin Werner, Hemau (DE); Eckbert Zander, Tegernheim (DE)

(73) Assignee: Siemens Aktiengesellschaft, Munich (DE)

(21) Appl. No.: 10/075,639

(22) Filed: Feb. 13, 2002

Related U.S. Patent Documents

Reissue of:
(64) Patent No.: 6,293,250
Issued: Sep. 25, 2001
Appl. No.: 09/626,265
Filed: Jul. 25, 2000

U.S. Applications:

(63) Continuation of application No. PCT/DE99/03581, filed on Nov. 10, 1999.

(30) Foreign Application Priority Data

Nov. 25, 1998 (DE) ..... 198 54 509

(51) Int. Cl.[7] ..... F02M 33/04
(52) U.S. Cl. ..... 123/446; 123/450; 123/496
(58) Field of Search ..... 123/496, 500, 123/501, 450, 446

(56) References Cited

U.S. PATENT DOCUMENTS 5,099,814 A * 3/1992 Ament ..... 123/450
5,123,393 A * 6/1992 Djordjevic ..... 123/502
5,666,921 A * 9/1997 Collingborn ..... 123/450

FOREIGN PATENT DOCUMENTS

| | | |
|---|---|---|
| DE | 3844363 A1 | 7/1990 |
| EP | 0481964 A2 | 4/1992 |
| EP | 0643220 A1 | 3/1995 |
| EP | 0643221 A1 | 3/1995 |
| GB | 1429936 | 3/1976 |
| GB | 2262575 A | 6/1993 |

OTHER PUBLICATIONS

Published International Application No. 80/02183 (Takacs), dated Oct. 16, 1980.

Published International Application No. 91/02897 (Rembold et al.), dated Mar. 7, 1991.

* cited by examiner

*Primary Examiner*—Thomas N. Moulis
(74) *Attorney, Agent, or Firm*—Laurence A. Greenberg; Werner H. Stemer; Ralph E. Locher

(57) ABSTRACT

An apparatus for producing a variable volumetric flow in a fuel feed system includes a high-pressure pump having at least one inlet, at least one cylinder, at least one piston each moveable in a respective cylinder, and a shaft driving the at least one piston. A metering device is disposed in the at least one inlet of the high-pressure pump, is synchronized with the shaft and feeds a variably meterable volume of fuel to the at least one cylinder during each revolution of the shaft. Metering is performed by varying an angle between opening and closure of the at least one inlet.

12 Claims, 11 Drawing Sheets

APPARATUS FOR PRODUCING A VARIABLE VOLUMETRIC FLOW IN A FUEL FEED SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of copending International Application No. PCT/DE99/03581, filed Nov. 10, 1999, which designated the United States.

BACKGROUND OF THE INVENTION

FIELD OF THE INVENTION

The invention relates to an apparatus for producing a variable volumetric flow in a fuel feed system, especially for use in common-rail injection systems.

In common-rail injection systems, it is necessary to pump the fuel out of a tank, to compress it and to hold the compressed fuel ready for injection by injectors in a pressure reservoir referred to as a rail. The pressure in the rail and the quantity of fuel removed from the rail by injection vary with the operating conditions of the engine.

In order to enable the pressure in the rail and therefore also the volumetric flow delivered to the rail to be influenced in an appropriate manner, use is made, for example, of a configuration described in European Patent Applications 0 643 220 and 0 643 221, corresponding to U.S. Pat. Nos. 5,427,066 and 5,746,180. An upstream feed pump draws the fuel from a tank through a filter and supplies the high-pressure pump. The compressed fuel is stored in the rail and injected into combustion chambers by the injectors. In that method, use is made of constant-displacement pumps, which deliver a fixed volume with each revolution of the shaft. A variable delivery rate of the system is achieved by discharging the unrequired but already compressed volumetric flow with the aid of a valve. However, that principle is not advantageous for high-pressure systems in terms of energy.

In terms of energy, preference should be given to systems in which the pump delivers only a volumetric flow limited to the quantity that is actually required. A method known from low-pressure systems, in which the volumetric flow is influenced through the use of the adjustability of the volume of the displacer elements is disadvantageous in the case of diesel injection systems because of the high mechanical outlay and the large control forces that are required. Pumps with constant-volume displacer elements are accordingly more advantageous. In pumps with constant-volume displacer elements, the variable volumetric flow is achieved by differences in the filling ratio of the displacer volumes. One possibility, for example, is to force the volume that is not required in piston pumps out of the initially completely full cylinder before compression begins. The fuel can be forced back into the inlet line or into an additional bypass with the aid of a controllable valve. The disadvantage therein is that a quick-operating valve is necessary for each displacer element.

Instead of filling the cylinder completely at the outset and releasing the quantity that is not required, it is also possible to vary the filling level from the outset by limiting the supply to the displacer elements.

One possibility for limiting the supply is to throttle the entire volumetric flow fed to the pump or the volumetric flow fed to each individual displacer element. In that case, use is made of adjustable throttle valves, which allow proportional variation of the volumetric flow by variation of the throttling cross section. The maximum cross section of the throttle valve is set for the maximum volumetric flow at full load and rated speed. The interaction between the maximum volumetric flow that can be delivered, which is dependent on the rotational speed of the pump, and the adjustability of the throttle valve, yields a relationship between the adjustable volumetric flow and the manipulated variable as a function of the rotational speed of the pump. At low rotational speeds of the pump associated with a low maximum volumetric flow that can be delivered, the useful adjustment range of the throttle valve is severely limited since only a small area of the throttling cross-sectional area can be used with throttling effect. It is only at maximum rotational speed that the full adjustment range of the valve can be exploited. If, for example, a pump is to be operated at a rated speed of 3000 rpm and a delivery rate of 0.5 ml per revolution, the throttle valve must be constructed for a maximum volumetric flow of 1500 ml/min. At a speed of 300 rpm and the maximum volumetric flow delivered resulting therefrom of 150 ml/min, only 10% of the adjustment range of the throttle valve is used for control between zero load and full load.

Another disadvantage of known high-pressure piston pumps with a plurality of cylinders and central limitation of the volumetric flow being fed in, is the outlay associated with ensuring uniform delivery-flow pulsation. Due to the finite number of displacer elements, there is always pulsation in the delivery flow from the pump, due to the very principle involved. The fluctuation in the delivery flow about a mean value, which is referred to as pulsation for short, results from the superposition of the component delivery flows coming from the individual displacer elements to give an overall delivery flow. The minimum pulsation for a fixed number of displacer elements is obtained if all of the displacer elements have the same component delivery flow. Therefore, in the case of piston pumps, it is a matter of filling each individual cylinder equally. If the supply is limited centrally and distribution between the individual cylinders takes place downstream, agreement between the characteristics of the inlet valves in particular is responsible for an equal filling ratio of the individual cylinders and therefore for uniform delivery flow pulsation. Differences in the characteristics of the inlet valves and the resulting differences in the flow rates are particularly noticeable at partial load in the form of nonuniform delivery-flow pulsation. Producing valves with the same inlet valve characteristic is extremely expensive since it is difficult especially to produce springs of identical length required for the inlet valves.

SUMMARY OF THE INVENTION

It is accordingly an object of the invention to provide an apparatus for producing a variable volumetric flow in a fuel feed system, which overcomes the hereinafore-mentioned disadvantages of the heretofore-known apparatuses of this general type and in which it is possible, by limiting the supply, to adjust the delivery flow to all volumetric flows required between zero and full load at any rotational speed between an idling speed and a rated speed. With the foregoing and other objects in view there is provided, in accordance with the invention, an apparatus for producing a variable volumetric flow in a fuel feed system, comprising a high-pressure pump having at least one cylinder, at least one piston respectively moveable in the at least one cylinder, a shaft driving the at least one piston, and at least one inlet defining an angle between opening and closure of the at least one inlet; and a metering device disposed at the at least one inlet of the high-pressure pump, the metering device synchronized with the shaft and feeding a variably meterable volume of fuel to the at least one cylinder during each revolution of the shaft, and the metering device performing metering by varying the angle between opening and closure of the at least one inlet.

The advantage of the invention is that an adjustment range which is constant for all rotational speeds of the pump is ensured for the purpose of influencing the variable volumetric flow. Moreover, uniform, low delivery-flow pulsation is obtained by ensuring uniform distribution of the overall supply to the individual displacer elements. Finally, it is advantageous that the high-pressure pump can be operated at a very low feed pressure.

In particular, the invention makes provision for a predefined, meterable volume to be fed to the delivery elements of the high-pressure pump during each revolution of the pump. The resulting variable filling ratio of the displacer elements thus results in a volumetric flow that can be varied between zero and full load. At the same time, the adjustment of the filling ratio is decoupled from the rotational speed of the high-pressure pump. Consequently, the adjustment range for influencing the filling ratio is the same size for all rotational speeds. Metering is effected by varying the angle between the opening and closure of the inlets of the individual cylinders in synchronism with the angle of the shaft and thus as a function of the position of the pistons of the high-pressure pump. Preferably, the inlet to the cylinder of the high-pressure pump is always opened in the region of the top dead center position of the piston and closed at any desired piston position down to the region of the bottom dead center position. As a result, the cylinders fill with a defined volume that determines the filling ratio.

In particular, a continuous volumetric flow is fed by an upstream feed pump into the shaft, which also drives the pistons through cams or eccentrics, for example. The volumetric flow is distributed by passages and external grooves. A perforated sleeve is disposed in an axially adjustable manner on the shaft. The shape of the grooves on the shaft and the apertures in the sleeve are configured in such a way that different opening and/or closing angles are obtained, depending on the axial position of the sleeve. The shape of the apertures and grooves can also be interchanged. The shaft and the sleeve are situated in a casing with further passages for carrying the volumetric flow away to the individual cylinders. Moreover, the inlet and the outlet can also be formed in any desired combination in the casing and/or the shaft. In other words, both the inlet and the outlet are accommodated in the shaft or in the casing or one of them is situated in the casing and the other is situated in the shaft.

For example, by virtue of a slot-shaped configuration of the grooves and apertures and a specific orientation of the grooves and apertures, the metering of the supply and therefore opening begins when the groove and the aperture begin to overlap. The interruption of the supply (closure) takes place when the groove on the shaft has run out of overlap with the aperture in the sleeve. The instant of opening advantageously remains constant, given an orientation of the groove parallel to the axis.

Axial displacement of the sleeve changes the phase length of the overlap between the grooves and the aperture (angle). Combining these overlaps with the position of the piston allows a defined volume to be admitted to the cylinders. The axial displacement of the sleeve represents the adjustment range, which is the same size for all rotational speeds. For all rotational speeds, it is possible to operate with the same adjustment range between zero delivery (no overlap between the grooves and apertures during a complete revolution of 360° and full delivery (maximum phase length of the overlap of 180°, that is to say throughout the entire time during which the piston is moving from the top dead center position to the bottom dead center position). For the purpose of varying the angle, the closing instant can be selected to be fixed and the opening instant variable with respect to the shaft, or the opening instant can be selected to be fixed and the closing instant variable, or both can be selected to be variable. For example, the inlet to the cylinder or cylinders in each case can be opened at the top dead center position of the respective piston and closed at any desired position of the piston down to the bottom dead center position, in parallel.

Instead of a single "control slot", it is also possible in the same way to use a plurality of "control slots" in the form of grooves, apertures etc. on a sleeve, disk or core or a plurality of sleeves, disks or cones, each with a "control slot" in order to serve a plurality of pistons in parallel. Instead of a combination of a shaft, a displaceable sleeve and a casing, it is also possible in the same way to use only a combination of a displaceable shaft and a casing or a combination of a shaft and a displaceable casing. It is also possible to use conical or disk-shaped bodies or bodies shaped in some other suitable way instead of shafts and/or sleeves and/or casings.

Moreover, it is also possible for the inlet and the outlet to be interchanged in all embodiments. In other respects, the statements applicable to the displaceable sleeves also analogously apply to the other embodiments.

All of the lines and passages and cross sections of the overlapping grooves and apertures are constructed to be unthrottled at maximum rotational speed for maximum volumetric flow. Thus, limitation of the volumetric flow does not result from throttling but only from variation of the phase length of the opened inlet to the displacer elements. A high feed pressure is thus not necessary by virtue of the principle involved. The low feed pressure also results in lower leakage.

Another advantage of the metering of the supply for each individual cylinder in accordance with the invention, as compared with throttling of the entire pump supply, lies in the improvement in uniform distribution of the supply to the individual cylinders. The uniformity of distribution to the individual cylinders is dependent only on matching of the geometry and configuration of the grooves and apertures. The geometrical tolerances required for this purpose are significantly easier to comply with than, for example, the tolerances of spring characteristics for identical inlet valves.

Other features which are considered as characteristic for the invention are set forth in the appended claims.

Although the invention is illustrated and described herein as embodied in an apparatus for producing a variable volumetric flow in a fuel feed system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
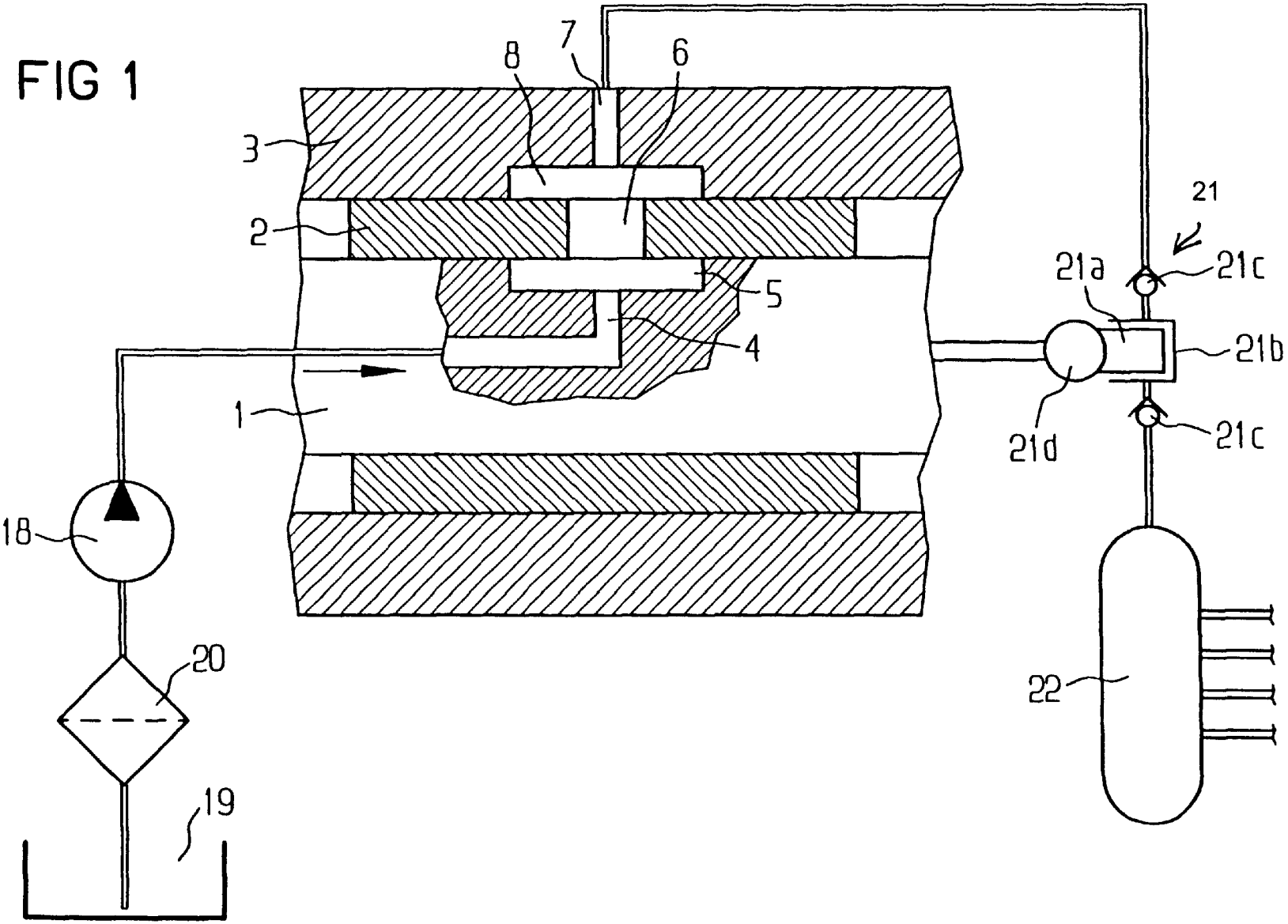
FIG. 1 is a schematic and fragmentary, diagrammatic, sectional view of a first general embodiment of an apparatus according to the invention.

Referring now to the figures of the drawings in detail and first, particularly, to FIG. 1 thereof, there is seen an exemplary embodiment in which a high-pressure pump 21 has a shaft 1 that drives a piston 21a thereof through an eccentric 21d. However, it is likewise also possible for a plurality of eccentrics or one or more cams to be provided. A cylinder 21b furthermore has inlet and outlet valves 21c. The shaft 1 is passed out of the high-pressure pump 21 and has a passage 4 therein that is connected to a groove 5. In this configuration, the groove 5 passes through an axially extending peripheral surface of the shaft 1. The passage 4 is connected to an outlet of an upstream feed pump 18. The feed pump 18 has an inlet connected through a filter 20 to a fuel tank 19. An outlet of the high-pressure pump 21 is connected to a rail 22, which serves for the storage of pressurized fuel and from which non-illustrated injectors are supplied with the pressurized fuel. An inlet of the high-pressure pump 21 is connected to a passage 7 that is formed in a casing 3 and is connected to a groove 8.

The casing 3 has a bore that accommodates the shaft 1 and a sleeve 2 surrounding the shaft 1. The sleeve 2, which does not corotate, is disposed in an axially displaceable manner on the shaft. The groove 8 formed in the casing 3 and the groove 5 formed in the shaft 1 are disposed in such a way that they lie opposite one another. The sleeve 2 is disposed between the two grooves 5 and 8. The groove 8 can also extend over the entire circumference of the casing 3. As an alternative, the groove 5 could extend over the entire circumference of the shaft 1. An aperture 6 in the sleeve 2 is configured in such a way that different opening and closing angles are obtained, depending on the axial position of the sleeve 2.

Developments of the circumferential surfaces are used to illustrate the shape and configuration of the grooves 5 on the shaft 1 and of the apertures 6 in the sleeve 2 in the exemplary embodiments of FIGS. 2 to 7. Each of the exemplary embodiments relates to a high-pressure pump with three cylinders. The shaft 1 therefore has three grooves 5a, 5b, 5c and the sleeve 2 therefore has three apertures 6a, 6b, 6c. The grooves 5a, 5b, 5c and the apertures 6a, 6b, 6c are constructed as longitudinal slots. The grooves 5a, 5b, 5c extend in the axial direction and are staggered along the circumferential surface of the shaft 1. In other words, on one hand, the grooves 5a, 5b, 5c are offset with respect to one another by a certain amount both in the axial direction and in the circumferential direction. On the other hand, the apertures 6a, 6b, 6c in the sleeve 2 are oriented at a certain angle between the circumferential direction and the axial direction and are offset parallel to one another in the axial direction and by a certain distance in the circumferential direction. The movement of the grooves 5a, 5b, 5c results from the rotation of the shaft in the circumferential direction and that of the apertures 6a, 6b, 6c from the adjustment of the sleeve in the axial direction. In the case of the orientation of the slot-shaped grooves 5a, 5b, 5c and apertures 6a, 6b, 6c shown in FIG. 2, the metering of the supply (opening) starts with the beginning of overlap between the groove 5a and the aperture 6a. Supply is interrupted (closure) when the groove 5a on the shaft 1 has moved out from under the aperture 6a in the sleeve 2 and there is therefore no longer any overlap. In the case of the developed circumferential surfaces in FIG. 2, this can be well illustrated by an imaginary vertical upward displacement of the shaft 1. Axial displacement of the sleeve 2 to the right alters the instant of closure since the groove 5a moves out of overlap with the aperture 6a earlier. The instant of opening remains constant because of the orientation of the groove 5a parallel to the axis. The inlet to the cylinder 21b is opened in each case in a top dead center position of the piston 21a and is closed at any desired piston position down to a bottom dead center position.

Axial displacement of the sleeve 2 alters the angle (phase length) of overlap of the groove 5a and the aperture 6a. Combining these overlaps with the position of the respective piston 21a allows a defined volume to be admitted to the respective cylinder 21b. The axial displacement of the sleeve 2 represents an adjustment range, which is equal for all rotational speeds. At the same time, the use of straight grooves and slots results in a nonlinear relationship between the axial displacement of the sleeve and a filling ratio of displacer elements. The relationship is the same for all rotational speeds between a minimum rotational speed $n_{min}$ and a maximum rotational speed $n_{max}$.

Figure 2:
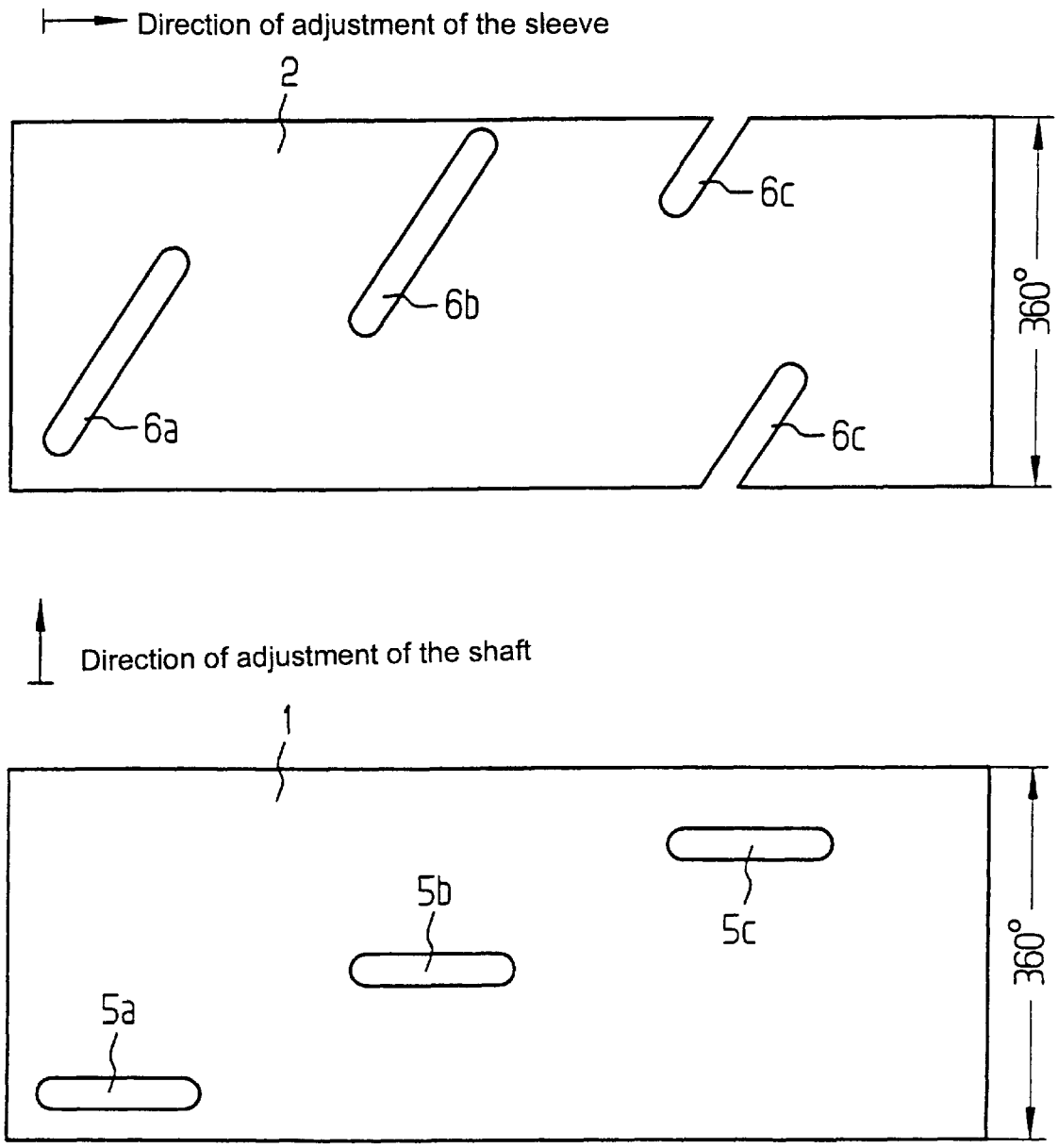
FIG. 2 is a first developed view of the apparatus according to the invention shown in FIG. 1.
Figure 3:
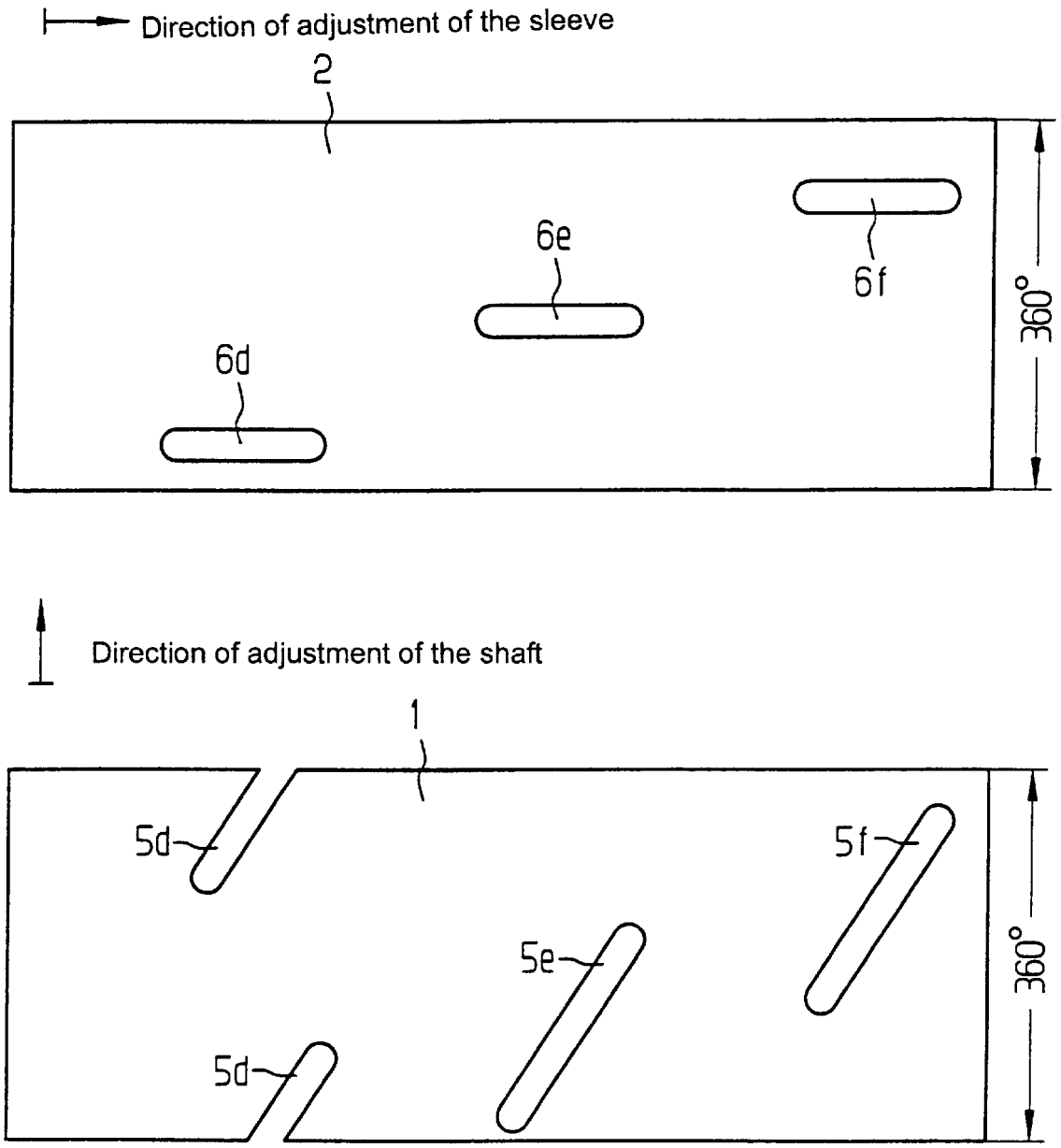
FIG. 3 is a second developed view of the apparatus according to the invention shown in FIG. 1.

An embodiment of the sleeve 2 and of the shaft 1 shown in FIG. 3 is derived from the embodiment of FIG. 2 by interchanging the configuration and orientation of the slot-shaped grooves 5d, 5e, 5f and of the apertures 6d, 6e, 6f. The opening and closing behavior is maintained by retaining the relative orientation of the grooves 5d, 5e, 5f and of the apertures 6d, 6e, 6f with regard to the direction of motion of the shaft 1 and the direction of adjustment of the sleeve 2. The embodiment disclosed in FIG. 3 therefore acts in the same way as that disclosed in FIG. 2.

Figure 4:
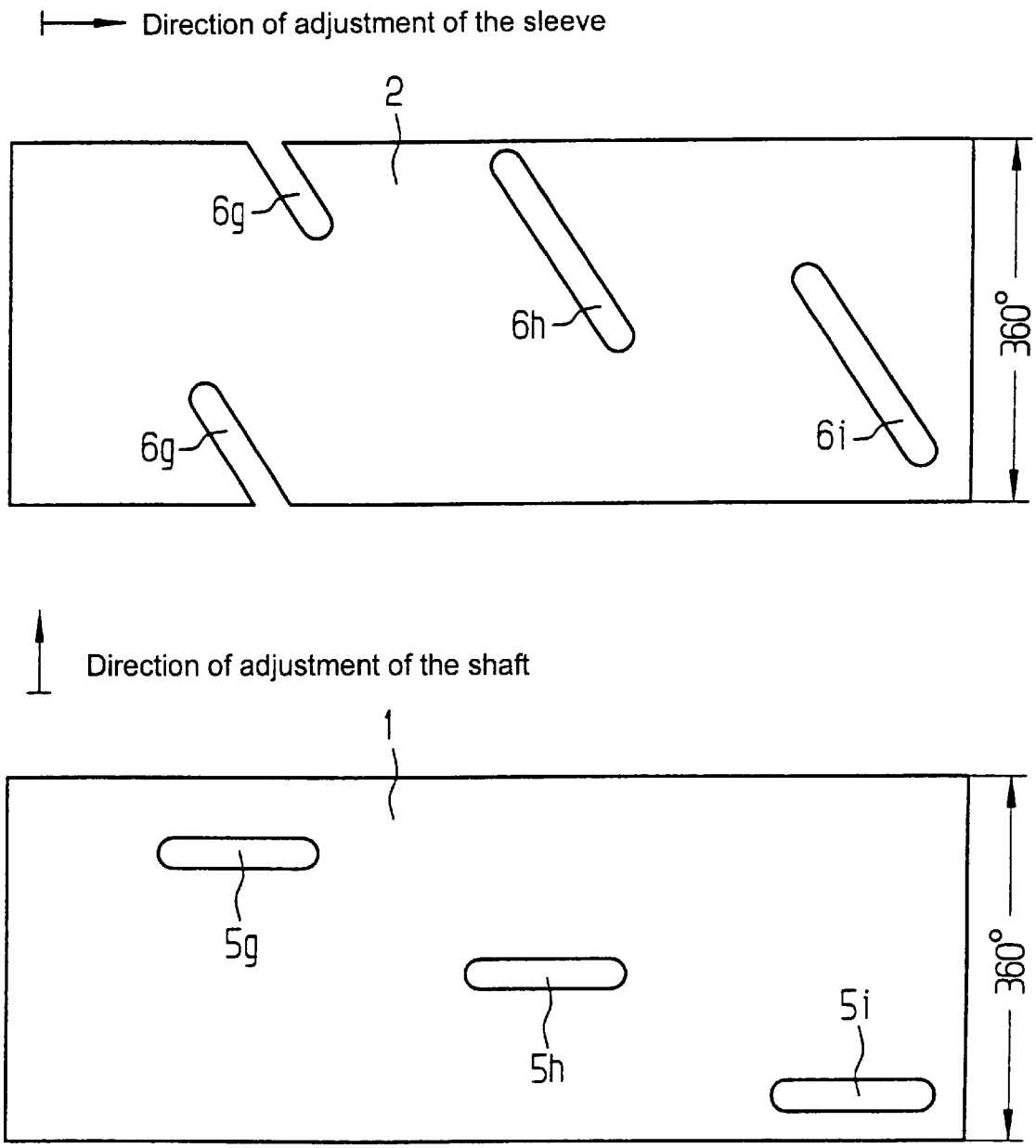
FIG. 4 is a third developed view of the apparatus according to the invention shown in FIG. 1.
Figure 5:
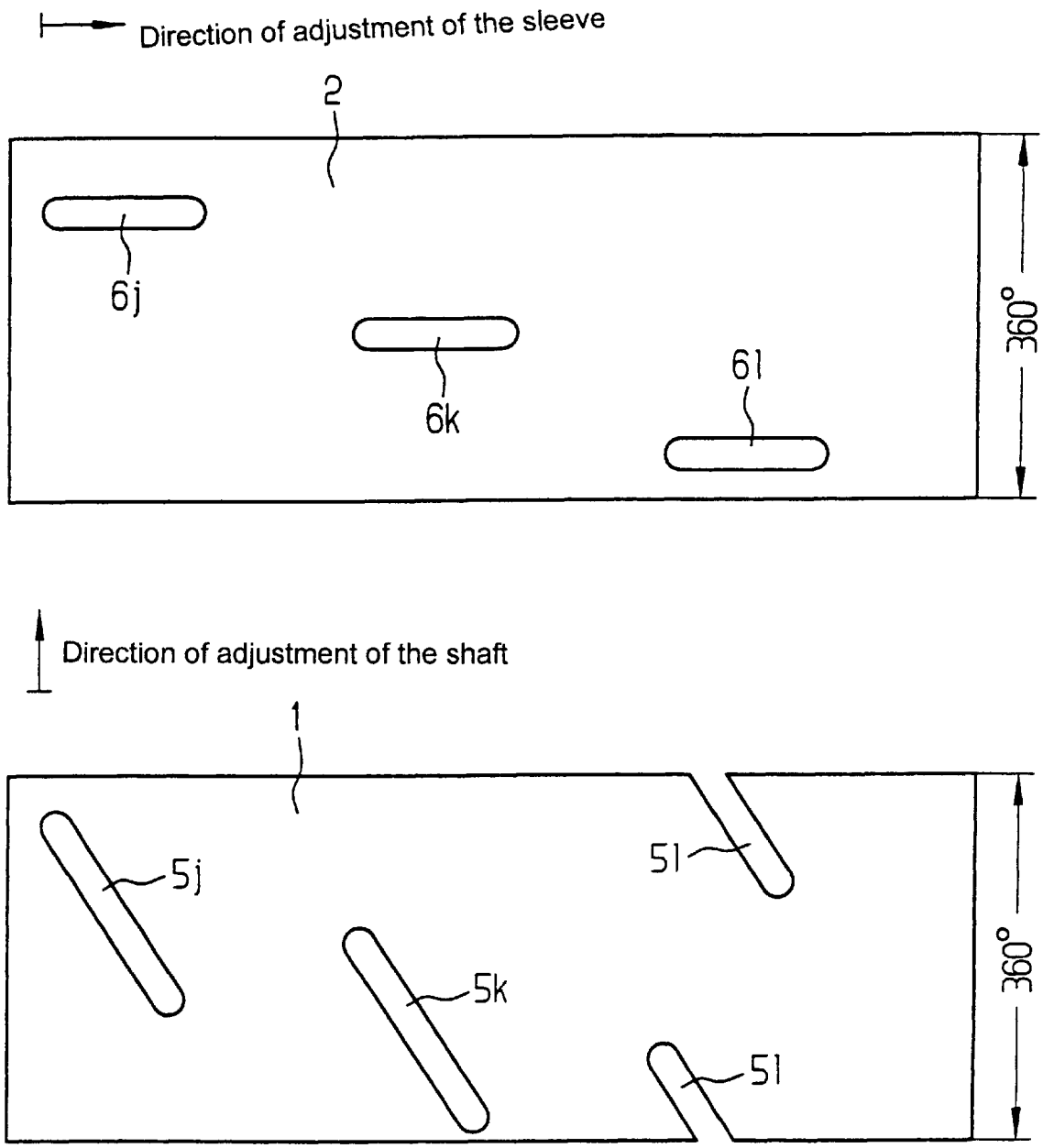
FIG. 5 is a fourth developed view of the apparatus according to the invention shown in FIG. 1.
Figure 6:
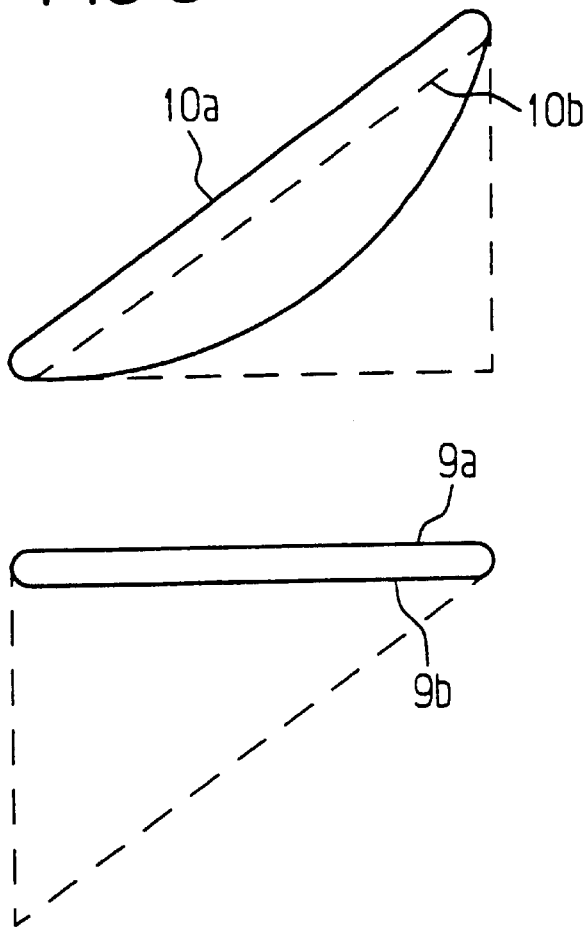
FIG. 6 is a general, fifth developed view of the apparatus according to the invention shown in FIG. 1.

The embodiments shown in FIGS. 4 and 5 are derived from those respectively shown in FIGS. 2 and 3, in as much as the angle between the respective slot-shaped groove 5g to 5l and the respective slot-shaped aperture 6g to 6l is no longer positive but negative. Apart from the positive or negative angle, the embodiment of FIG. 4 corresponds to that of FIG. 2 and the embodiment of FIG. 5 corresponds to that of FIG. 3. The directions of movement and adjustment and the orientations illustrated in FIGS. 2 and 3 result in a fixed opening angle and a closing angle which varies between 180° and 0°. A variable opening angle and a fixed closing angle are obtained in the exemplary embodiments shown in FIGS. 4 and 5.

In the exemplary embodiments shown thus far, the grooves and apertures are constructed as parallel slots. However, as shown, for example, in FIG. 6, these elements can also be given another shape. Thus, for example, an edge 10b of a groove or an aperture can be turned until it is parallel to an edge 9a of an associated aperture or an associated groove. This enlarges only the overlap cross section, which does not have a throttling effect in any case, and does not extend the length of the overlap phase (angle). Any desired shape of the aperture and of the groove is possible within the respective triangle indicated in broken lines. Consequently, a rear edge 9b of the groove or aperture can also likewise be turned about the right-hand bottom edge until it is parallel to an edge 10a. In this case too, any other shape is conceivable as long as it lies within the associated triangle indicated by broken lines.

Figure 7:
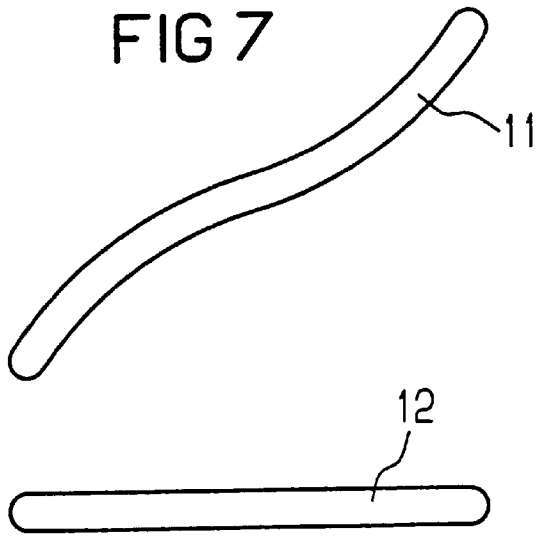
FIG. 7 is a view of a special configuration of the development shown in FIG. 6.

The shape of the edges of grooves and apertures can furthermore deviate from a straight line. FIG. 7 shows a possible variant in this respect. In this case, a groove or aperture 11 is disposed at a positive angle between 0° and 90° to an aperture or groove 12. While the aperture or groove 12 is a rectilinear slot, the groove or aperture 11 has a serpentine form. This can be used, for example, to achieve a linear relationship between the adjustment travel of the respective non-illustrated sleeve and the filling ratio of the associated cylinder. Instead of a positive angle between the groove and the aperture, it is likewise possible to use a negative angle and to use any other shape instead of the serpentine or slot shape in order to obtain a relationship that is advantageous in terms of control.

Figure 8:
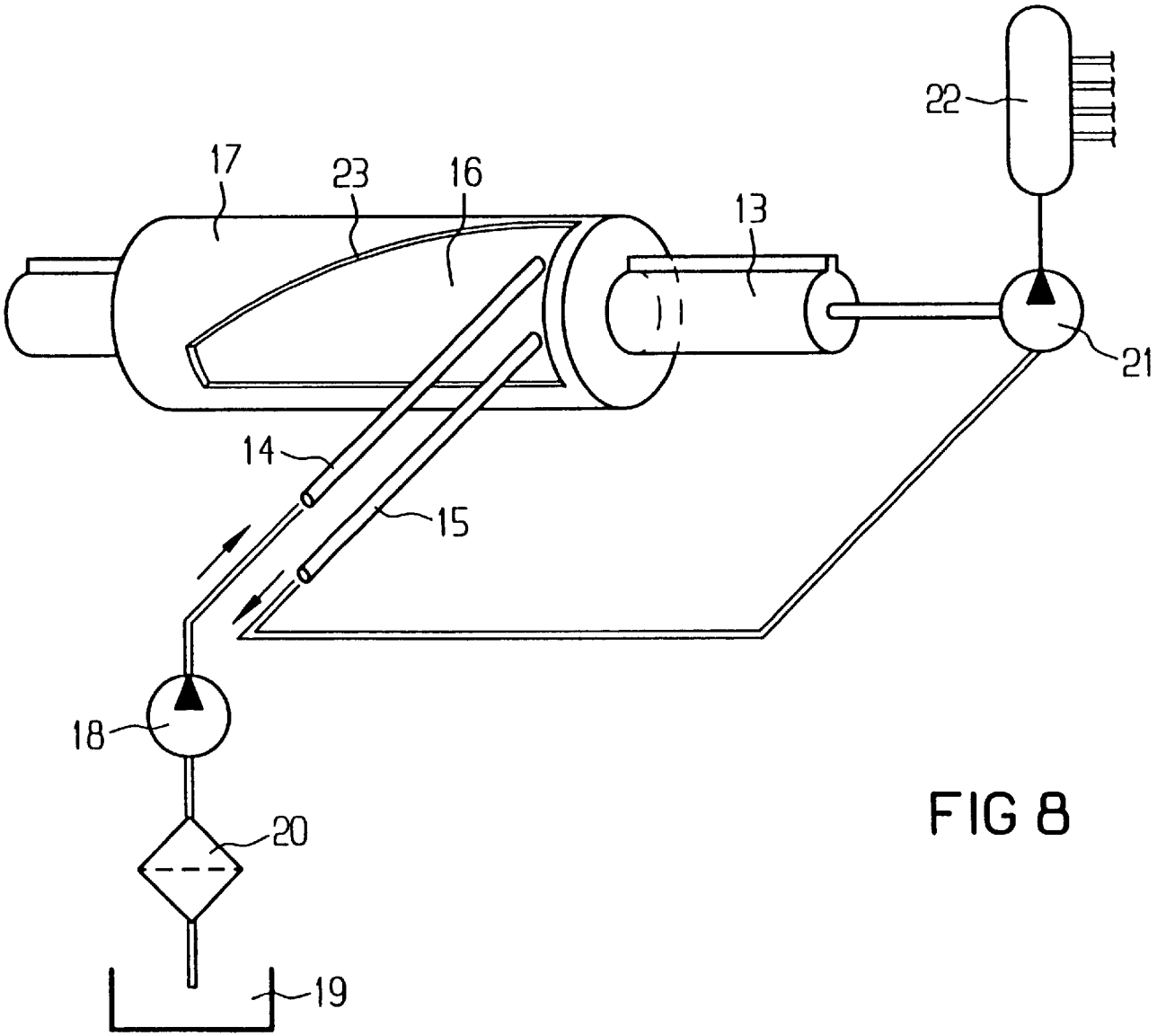
FIG. 8 is a schematic and perspective view of a second general embodiment of an apparatus according to the invention.

Another embodiment of a metering device with metering that is controlled through the phase length is obtained if not only the outlet to the cylinders but also the inlet from the upstream feed pump is fixed in the casing of the metering device. An embodiment of this kind is illustrated in FIG. 8. An axially displaceable sleeve 17 that is disposed on a shaft 13 rotates with the shaft 13 in a casing. An inlet 14 from the upstream feed pump 18 and an outlet 15 to the high-pressure pump 21 take the form of fixed passages in a casing. A groove 16 with at least one oblique edge 23 is disposed on the displaceable sleeve 17. It is possible to vary the angle between opening and closing and therefore the phase length of the passage from the inlet 14 to the outlet 15 by displacing the sleeve 17 axially. The statements made above apply analogously to the position, orientation and shape of the oblique edge 23. The casing has been omitted in FIG. 8 for the sake of clarity.

Figure 9:
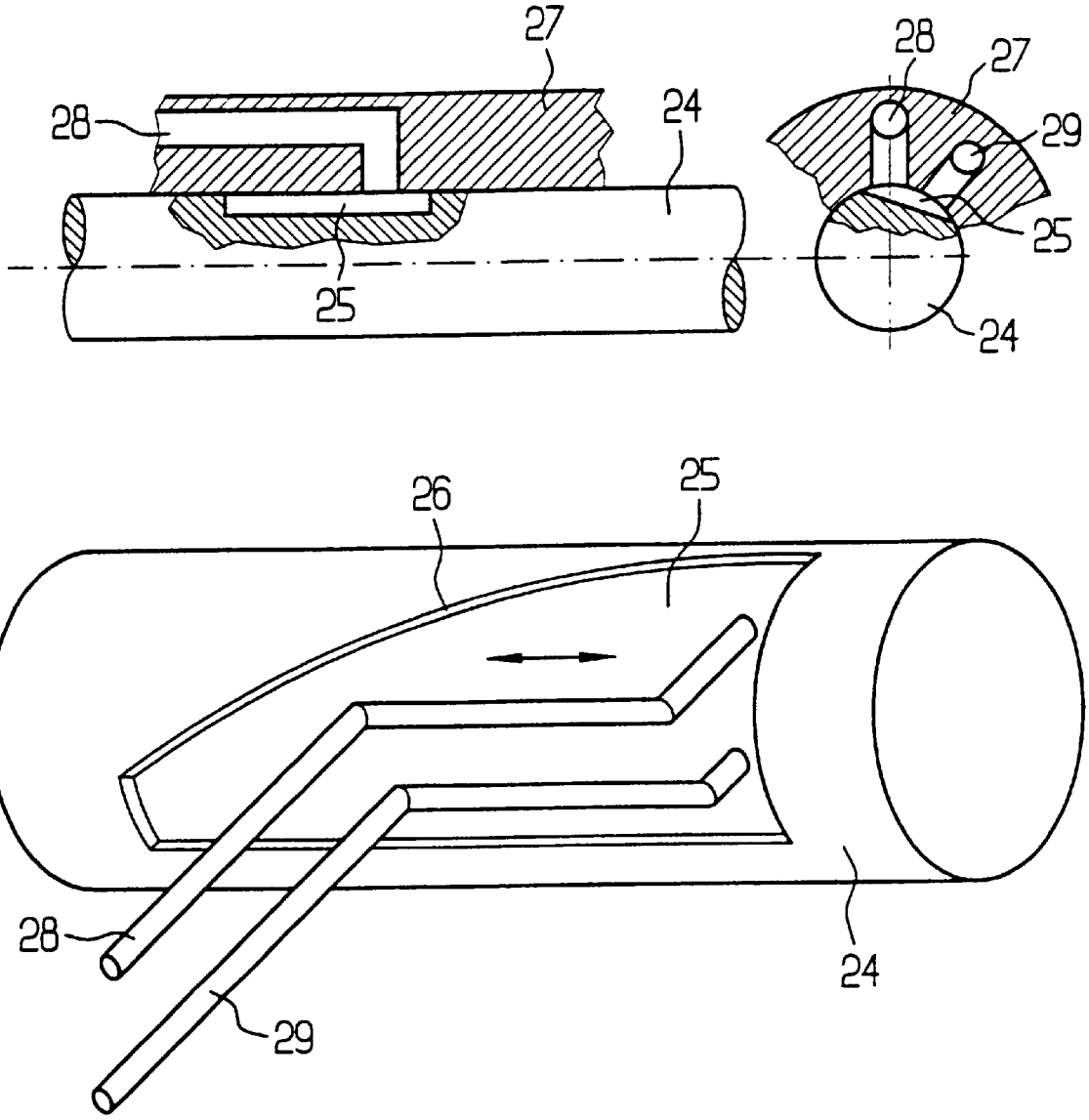
FIG. 9 includes fragmentary, sectional and perspective views of an alternative configuration of the development shown in FIG. 8.

In the embodiment shown in FIG. 8, it would moreover be possible to omit the sleeve 17 if the shaft were axially displaceable relative to the casing and the groove 16 with the edge 23 were made in the shaft 13. An embodiment of this kind is shown in FIG. 9. In this case, there is an approximately triangular groove 25 with an oblique edge 26 in a shaft 24. An inlet 28 and an outlet 29 are formed as passages aligned radially with respect to the shaft 24 at the ends in a casing 27 for the purpose of accommodating the shaft 24. The shaft 24 can be displaced axially relative to the casing 27. Since the relative movement and shaping are the same, the mode of operation corresponds to the embodiment shown in FIG. 8.

The control slots in the cylindrical shafts or sleeves as described above can also be machined into axially touching disks, nested cones or bodies of some other shape.

Figure 10:
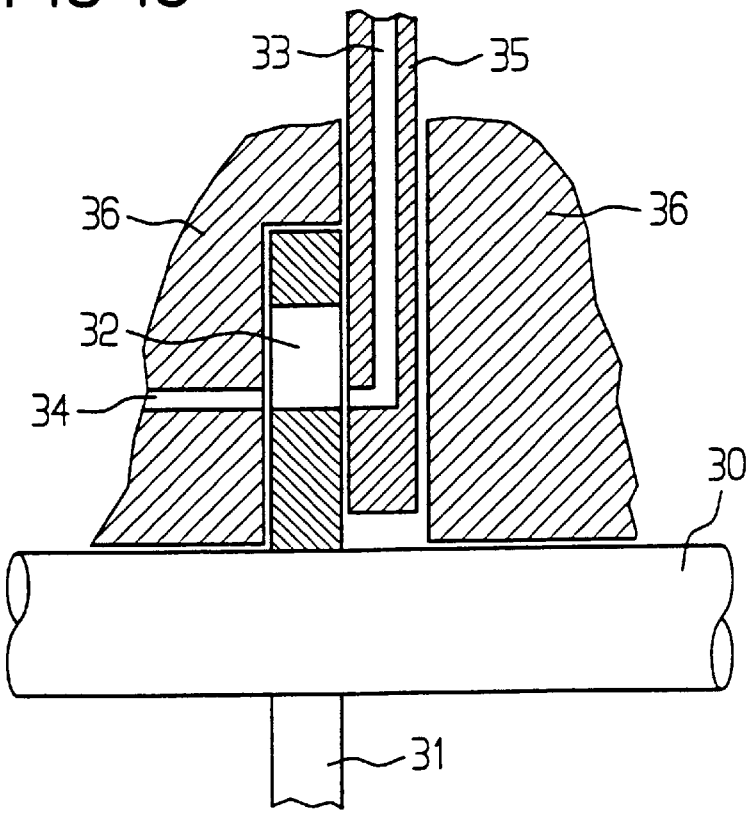
FIG. 10 includes fragmentary, sectional and perspective views of a third general embodiment of an apparatus according to the invention.
Figure 10:
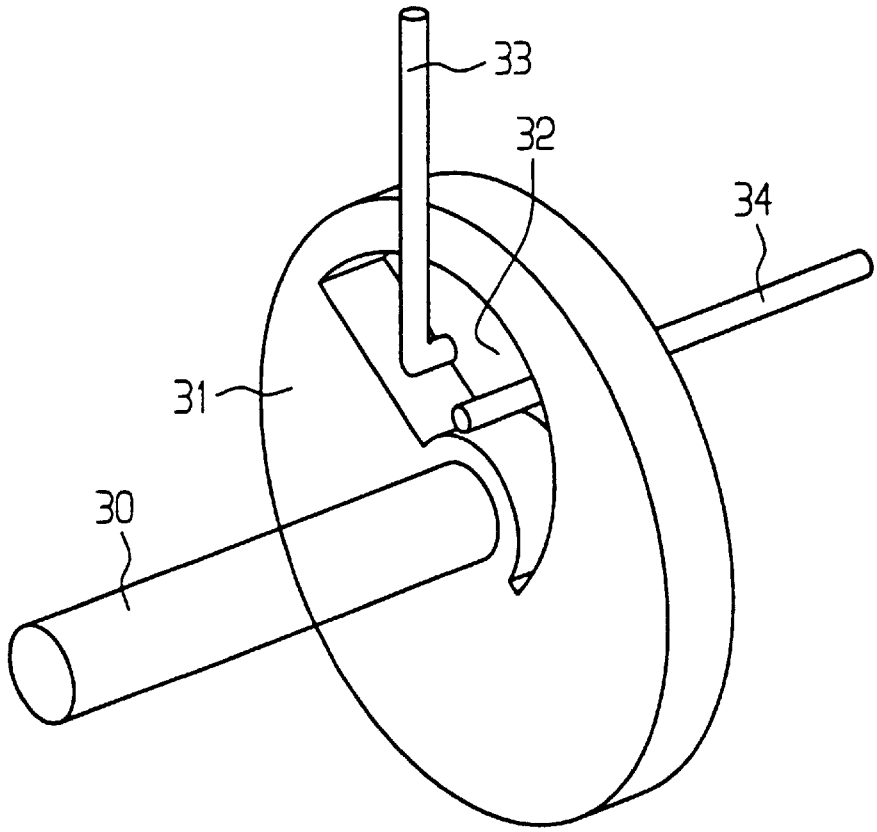

In the embodiment shown in FIG. 10, a disk 31 mounted or formed on a shaft 30 is provided with an aperture 32 that penetrates the disk 31 in a direction parallel to the axis of the shaft. A passage which can be displaced in the radial direction, parallel to the plane of the disk, forms an inlet 33 and is disposed in such a way that it meets the aperture 32 or not, depending on its axial position. A passage disposed parallel to the axis of the shaft and acting as an outlet 34 is disposed in a fixed location on the opposite side of the disk 31 from the inlet 33. This is done in such a way that, with the given shape of the aperture, the maximum possible overlap between the outlet 34 and the aperture 32 is achieved during a rotation of the shaft 30. The inlet 33 is accommodated in a slide 35 that, for its part, is located in a casing 36, like the shaft 30, the disk 31 and the outlet 34. The shape of the aperture in the exemplary embodiment under consideration is based on a semicircle surrounding the shaft. The aperture widens in the radial direction as the disk angle increases. However, apart from the shape shown, it is also possible for any other suitable shape to be used. It is possible in turn for the phase length of the overlap of the inlet 33, the outlet 34 and the disk 31 and therefore the phase length of the opened inlet to the delivery elements to be varied by radial displacement of the slide 35 and therefore of the inlet 33. As an alternative, the inlet and outlet can be accommodated jointly in the slide, in which case a correspondingly shaped groove is machined into the disk instead of the aperture.

Figure 11:
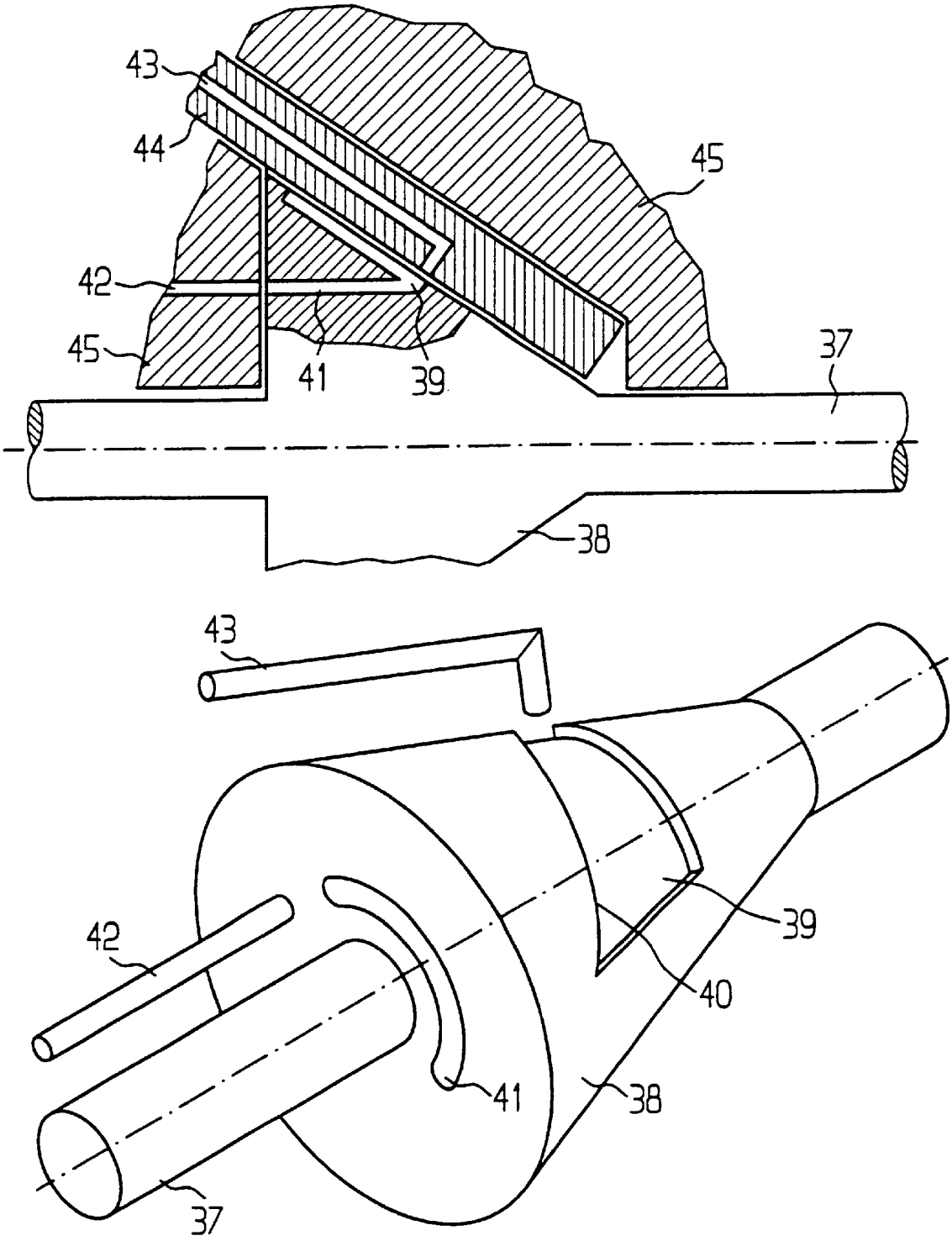
FIG. 11 includes fragmentary, sectional and perspective views of a fourth general embodiment of an apparatus according to the invention.

FIG. 11 shows an exemplary embodiment with a conical main body mounted or formed on a shaft 37. The main body is denoted below as a cone 38. A groove 39 which is formed in a peripheral surface of the cone 38 is provided with an oblique edge 40 and is connected to a passage 41 leading to a base surface of the cone.

In the exemplary embodiment under consideration, the outlet opening of the passage 41 in the region of the base surface of the cone takes the approximate form of an opening that is disposed in a semicircle around the shaft and, for example, has a constant width. The opening is constructed in such a way that the maximum overlap occurs between a fixed-location outlet 42 extending parallel to the shaft, and the opening. An inlet 43 is integrated into a slide 44, which can be displaced along the circumferential surface in the direction between the tip of the cone and the base surface. A particular phase length of the overlap between the inlet 43 and the groove 39 occurs in dependence on the position of the slide 44. The above statements analogously apply with regard to the shaping of the groove 39. Finally, a casing 45 is provided to accommodate the shaft 37, the cone 38, the outlet 42 and the slide 44. As in the exemplary embodiment shown in FIG. 10, the outlet can also be integrated into the slide, and a groove can be provided instead of the aperture.

It is moreover also possible in all of the exemplary embodiments for the inlet and the outlet to be interchanged. The statements made in relation to the displaceable sleeves likewise analogously apply to the remaining exemplary embodiments. Although only one "control slot" is illustrated in the exemplary embodiments of FIGS. 10 and 11, it is also possible in the same way for a plurality of "control slots" in the form of grooves, apertures etc. to be used on one sleeve, disk or cone or on a plurality of sleeves, disks or cones, each with a "control slot".

Figure 12:
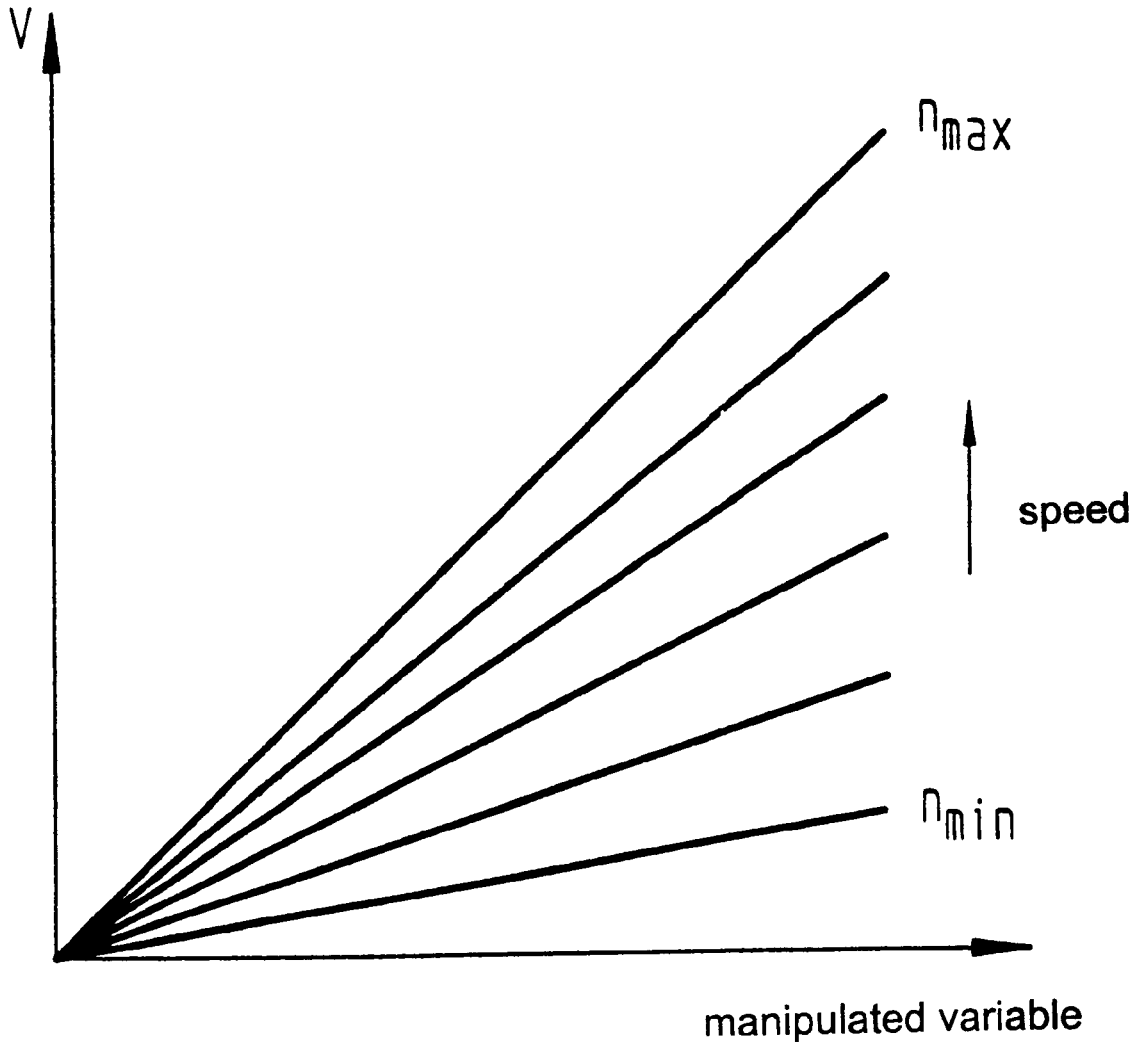
FIG. 12 is a characteristic diagram of an apparatus according to the invention.

FIG. 12 shows a characteristic line intended to illustrate an example of a relationship between a manipulated variable (for example the displacement travel of the sleeve relative to the shaft) and a volumetric flow V. It is possible, at all rotational speeds, to operate with the same adjustment range between zero delivery (no overlap between the grooves and the apertures during one complete revolution of 360°) and full delivery (maximum phase length of overlap of 180°, that is to say in the entire time in which the piston is moving from the top dead center position to the bottom dead center position).

In the case of appropriately shaped slots and grooves (see the embodiment shown in FIG. 7), a linear characteristic that begins at the origin and has a slope which is dependent on the rotational speed is obtained in each case for the volumetric flow V as a function of the manipulated variable S at different rotational speeds n between a minimum rotational speed $n_{min}$ and a maximum rotational speed $n_{max}$.

We claim:

1. An apparatus for producing a variable volumetric flow in a fuel feed system, comprising:

a high-pressure pump having at least one cylinder, at least one piston respectively moveable in said at least one cylinder, a shaft driving said at least one piston, and at least one inlet defining an angle between opening and closure of said at least one inlet; and a metering device disposed at said at least one inlet of said high-pressure pump, said metering device synchronized with said shaft and feeding a variably meterable volume of fuel to said at least one cylinder during each revolution of said shaft, said metering device performing metering by varying said angle between opening and closure of said at least one inlet, said metering device having at least one of grooves and apertures to be displaced relative to one another and defining an angle of overlap therebetween, and said angle between opening and closure of said at least one inlet is varied by varying said angle of overlap.

2. The apparatus according to claim 1, wherein said at least one of grooves and apertures are rotary slides.

3. The apparatus according to claim 1, including:

a sleeve axially displaceable on said shaft into an axial position, said sleeve having at least one aperture formed therein;

a casing at least partially containing said shaft and said sleeve;

said shaft having at least one interior hollow passage formed therein receiving a continuous volumetric flow of fuel, and said shaft having at least one groove formed therein communicating with said at least one interior hollow passage;

said casing having at least one further passage formed therein for carrying away the volumetric flow; and said at least one groove in said shaft and said at least one aperture in said sleeve having shapes causing said axial position of said sleeve to define different opening and closing angles.

4. The apparatus according to claim 1, wherein said grooves and said apertures are rectilinear slots, and said grooves and said apertures each have an orientation with a predetermined angular difference other than zero therebetween.

5. The apparatus according to claim 3, wherein said at least one groove and said at least one aperture are rectilinear slots, and said at least one groove and said at least one aperture each have an orientation with a predetermined angular difference other than zero therebetween.

6. The apparatus according to claim 1, wherein said grooves and said apertures are curved slots.

7. The apparatus according to claim 3, wherein said grooves and said apertures are curved slots.

8. An apparatus for producing a variable volumetric flow in a fuel feed system, comprising:

a high-pressure pump having at least one cylinder, at least one piston respectively moveable in said at least one cylinder, a shaft driving said at least one piston, and at least one inlet defining an angle between opening and closure of said at least one inlet;

a metering device disposed at said at least one inlet of said high-pressure pump, said metering device synchronized with said shaft and feeding a variably meterable volume of fuel to said at least one cylinder during each revolution of said shaft, and said metering device performing metering by varying said angle between opening and closure of said at least one inlet;

a casing;

a disk-shaped main body disposed in said casing, connected to said shaft, and having at least one of grooves and apertures;

at least one of an inlet and an outlet displaceable relative to said at least one of grooves and apertures;

said at least one of grooves and apertures and said at least one of an inlet and an outlet defining an angle of overlap therebetween; and said at least one of an inlet and an outlet having an angle between an opening and a closure thereof being varied by varying said angle of overlap.

9. An apparatus for producing a variable volumetric flow in a fuel feed system, comprising:

a high-pressure pump having at least one cylinder, at least one piston respectively moveable in said at least one cylinder, a shaft driving said at least one piston, and at least one inlet defining an angle between opening and closure of said at least one inlet;

a metering device disposed at said at least one inlet of said high-pressure pump, said metering device synchronized with said shaft and feeding a variably meterable volume of fuel to said at least one cylinder during each revolution of said shaft, and said metering device performing metering by varying said angle between opening and closure of said at least one inlet;

a casing;

a conical main body disposed in said casing, connected to said shaft and having at least one of grooves and apertures;

at least one of an inlet and an outlet displaceable relative to said at least one of grooves and apertures;

said at least one of grooves and apertures and said at least one of an inlet and an outlet defining an angle of overlap therebetween; and said at least one of an inlet and an outlet having an angle between an opening and a closure thereof being varied by varying the angle of overlap.

10. The apparatus according to claim 1, including a sleeve surrounding said shaft and having at least one groove with at least one oblique edge, and a casing at least partly surrounding said sleeve and said shaft and having fixed inlet ad outlet passages.

11. The apparatus according to claim 1, wherein an opening instant is fixed and a closing instant is variable in relation to said shaft, for varying said angle.

12. The apparatus according to claim 1, wherein said at least one cylinder has a top dead center position and a bottom dead center position, and said inlet to said at least one cylinder is opened in the vicinity of said top dead center position and is closed in any desired position down to the vicinity of said bottom dead center position.

* * * * *